US 11,472,250 B2

(12) United States Patent
Yamamoto et al.

(10) Patent No.: US 11,472,250 B2
(45) Date of Patent: Oct. 18, 2022

(54) SUSPENSION DEVICE AND ASSEMBLY METHOD THEREFOR

(71) Applicant: NSK LTD., Tokyo (JP)

(72) Inventors: Shin Yamamoto, Kanagawa (JP);
Takahiro Sushi, Kanagawa (JP); Cyou Kyo, Kanagawa (JP); Mitsuru Oike, Kanagawa (JP); Shunsuke Suzuki, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/636,515

(22) PCT Filed: Jan. 25, 2021

(86) PCT No.: PCT/JP2021/002474
§ 371 (c)(1),
(2) Date: Feb. 18, 2022

(87) PCT Pub. No.: WO2021/157408
PCT Pub. Date: Aug. 12, 2021

(65) Prior Publication Data
US 2022/0266646 A1    Aug. 25, 2022

(30) Foreign Application Priority Data

Feb. 5, 2020    (JP) .............................. JP2020-018121

(51) Int. Cl.
*B60G 17/015*    (2006.01)
*B60G 15/04*    (2006.01)

(52) U.S. Cl.
CPC ......... *B60G 17/0157* (2013.01); *B60G 15/04* (2013.01); *B60G 2202/312* (2013.01);
(Continued)

(58) Field of Classification Search
CPC ................ B60G 17/0157; B60G 15/04; B60G 2202/312; B60G 2204/418;
(Continued)

(56) References Cited

U.S. PATENT DOCUMENTS 5,152,547 A * 10/1992 Davis ........................ F16F 5/00
                                                          267/64.11
2009/0121398 A1* 5/2009 Inoue .................. B60G 17/0157
                                                         267/140.14
(Continued)

FOREIGN PATENT DOCUMENTS

JP          04-059408 A       2/1992
JP         H-04191114 A   *   7/1992
(Continued)

OTHER PUBLICATIONS

International Search Report for PCT/JP2021/002474, dated Mar. 30, 2021.
JP Decision to Grant a patent for 2021-548168, dated Sep. 22, 2021.

*Primary Examiner* — James A English
*Assistant Examiner* — Kurtis Nielson
(74) *Attorney, Agent, or Firm* — Sughrue Mion, PLLC

(57)    ABSTRACT

A suspension device has an upper shell having a stepped section around an inner circumferential surface; a lower shell; a ball screw shaft rotatably supported by the upper shell; a bearing unit arranged between a part of the ball screw shaft and the upper shell, and having an outer side part in a radial direction including a side surface that comes in contact with a side surface on the other side in the axial direction of the stepped section; a ball nut screwed on the ball screw shaft; an inner tube joined to the lower shell and the ball nut; an electric motor; and a coil spring, and a
(Continued)

circumscribed circle diameter of the ball nut and the inner tube is less than an inner diameter dimension of the stepped section.

5 Claims, 7 Drawing Sheets

(52) U.S. Cl.
CPC .................. *B60G 2204/418* (2013.01); *B60G 2204/4502* (2013.01); *B60G 2204/62* (2013.01); *B60G 2206/41* (2013.01); *B60G 2206/80* (2013.01); *B60G 2500/104* (2013.01); *B60G 2800/162* (2013.01)

(58) Field of Classification Search
CPC ........ B60G 2204/4502; B60G 2204/62; B60G 2206/41; B60G 2206/80; B60G 2500/104; B60G 2800/162
See application file for complete search history.

(56) References Cited

U.S. PATENT DOCUMENTS

| | | | |
|---|---|---|---|
| 2011/0018214 A1* | 1/2011 | Kondo | F16F 15/03 |
| | | | 280/5.515 |
| 2012/0306170 A1* | 12/2012 | Serbu | B60G 17/0195 |
| | | | 280/5.514 |
| 2013/0060422 A1 | 3/2013 | Ogawa et al. | |
| 2019/0315181 A1* | 10/2019 | Lee | B60G 15/068 |

FOREIGN PATENT DOCUMENTS

| | | | | |
|---|---|---|---|---|
| JP | 3414140 B2 * | 6/2003 | ......... | B60G 17/0157 |
| JP | 2005-090697 A | 4/2005 | | |
| JP | 2008-279975 A | 11/2008 | | |
| JP | 2010-228579 A | 10/2010 | | |
| WO | 2011/142039 A1 | 11/2011 | | |
| WO | 2013/065674 A1 | 5/2013 | | |
| WO | WO-2015199463 A1 * | 12/2015 | ............ | B60G 17/00 |
| WO | WO-2017063645 A2 * | 4/2017 | | |

* cited by examiner

SUSPENSION DEVICE AND ASSEMBLY METHOD THEREFOR

CROSS REFERENCE TO RELATED APPLICATIONS

This application is a National Stage of International Application No. PCT/JP2021/002474 filed Jan. 25, 2021, claiming priority based on Japanese Patent Application No. 2020-018121 filed Feb. 5, 2020.

TECHNICAL FIELD

The present invention relates to a suspension device for supporting a wheel by a vehicle body, and to an assembly method for the suspension device.

BACKGROUND ART

A wheel of an automobile is supported by the vehicle body by a suspension device (suspension). The suspension device has a function of pressing the outer circumferential surface of a tire of the wheel against a road surface, while at the same time alleviating vibration and impact that are transmitted from the road surface to the vehicle body via the wheel. As a suspension device for an automobile, suspension devices that are capable of controlling dampening force or the like according to the traveling state of the automobile, the condition of the road surface and the like are being developed and have partially been put into use.

JP H04-059408A describes a suspension device (active suspension) that is capable of controlling dampening force or the like by using a hydraulic actuator instead of a shock absorber of a normal suspension device (passive suspension). The suspension device that is described in JP H04-059408A is capable of controlling dampening force or the like by controlling hydraulic pressure in a hydraulic chamber of a hydraulic actuator according to the traveling state of the automobile, the condition of the road surface and the like. However, the suspension device described in JP H04-059408A has a problem in that a hydraulic actuator is used, and thus a hydraulic pump, hydraulic piping and the like are required, resulting in an increase in costs.

On the other hand, JP 2010-228579A describes a suspension device that includes an electromagnetic motor, and that due to the rotational force of the electromagnetic motor, is capable of applying forces to the upper portion and lower portion of a spring in directions toward or away from each other. More specifically, in the suspension device described in JP 2010-228579A, a ball screw mechanism converts rotation of the motor shaft to linear motion in the axial direction of the screw rod, and applies forces to the upper portion and lower portion of the spring in directions toward or away from each other, or in other words, is configured to be able to adjust dampening force. The suspension device described in JP 2010-228579A uses an electromagnetic motor, and thus when compared with construction in which a hydraulic actuator is used, it is possible to simplify the construction and to reduce cost.

CITATION LIST

Patent Literature

[Patent Literature 1] JP H04-059408A
[Patent Literature 2] JP 2010-228579A

SUMMARY OF INVENTION

Technical Problem

The suspension device described in JP 2010-228579A has room for improvement from the aspect of simplifying the assembly work. In other words, in the suspension device described in JP 2010-228579A, a screw rod of a ball screw mechanism is rotatably supported by a double-row ball bearing so as to be able to rotate with respect to an inner tube, and the inner tube is fixed to and supported by a casing of the electromagnetic motor. The casing of the electromagnetic motor is joined and fixed to an upper support through a mount section and anti-vibration rubber. When assembling the suspension device described in JP 2010-228579A, first, a sub-assembly is formed by screwing a nut fixed to a nut support tube around the screw rod through bearing balls, rotatably supporting the screw rod on the inner side of the inner tube by a double-row ball bearing, and supporting and fixing the inner tube to the casing of the electromagnetic motor. After that, the sub-assembly is inserted inside the upper support, and the casing of the electromagnetic motor and the upper support are joined and fixed through the mount section and anti-vibration rubber.

In other words, in the suspension device described in JP 2010-228579A, when performing the assembly work, it is necessary to handle the heavy electromagnetic motor together with the ball screw mechanism and inner tube as an integrated sub-assembly.

Moreover, in the suspension device described in JP 2010-228579A, an outer tube internally fits inside the upper support so as to be able to displace in the vertical direction (axial direction), and a coil spring is held between an upper retainer (flange section) provided at an upper end portion of the upper support and a lower retainer provided in an intermediate portion of the outer tube. By causing the entire length of the upper support and the outer tube to contract, the coil spring elastically contracts. However, the entire length of the upper support and the outer tube can only be caused to contract up to where a lower end portion of the upper support collides with the lower retainer, and it is also not possible for the coil spring to contract more than this. Note that by moving the installation position of the lower retainer downward, it is possible to increase the possible amount of relative displacement (stroke) between the upper support and the outer tube; however, when the lower retainer is installed below the outer tube, there is a possibility that the layout may be hindered.

In consideration of the circumstances described above, an object of the present invention is to achieve construction of a suspension device that allows for assembly work to be easily performed, and that easily maintains the allowable amount of contraction of the coil spring.

Solution to Problem

The suspension device according to an aspect of the present invention includes an upper shell, a lower shell, a ball screw shaft, a bearing unit, a ball nut, a plurality of balls, an inner tube, an electric motor, and a coil spring.

The upper shell has a tubular shape and has a stepped section around an inner circumferential surface of an intermediate section in an axial direction.

The lower shell is arranged around a part on one side in the axial direction of the upper shell, and is able to displace in the axial direction relative to the upper shell, but is not able to rotate.

The ball screw shaft has a male ball screw groove around an outer circumferential surface of a part on the one side in the axial direction, and is rotatably supported on an inner side of the upper shell.

The bearing unit is arranged between a part on the other side in the axial direction of the ball screw shaft and the upper shell. The bearing unit has an outer side part in a radial direction that is prevented from rotating with respect to the upper shell and includes a side surface on the one side in the axial direction that comes in direct contact with or comes in contact through another member with a side surface on the other side in the axial direction of the stepped section. And the bearing unit rotatably supports the ball screw shaft with respect to the upper shell.

The ball nut has a female ball screw groove around an inner circumferential surface, and screws on the ball screw shaft.

The plurality of balls is arranged between the male ball screw groove and the female ball screw groove so as to be able to freely roll.

The inner tube is joined to the lower shell and the ball nut. In other words, the inner tube connects the lower shell and the ball nut so as to be able to integrally displace in the axial direction.

The electric motor has an output shaft that is connected to an end section on the other side in the axial direction of the ball screw shaft so as to be able to transmit torque, and is supported by an end section on the other side in the axial direction of the upper shell.

The coil spring is held in an elastically compressed state in the axial direction between the upper shell and the lower shell.

Particularly, in the suspension device according to an aspect of the present invention, a circumscribed circle diameter of the ball nut and the inner tube is less than an inner diameter dimension of the stepped section. In other words, the ball nut and the inner tube, in a state of being joined together, have a size capable of passing through the inner side in the radial direction of the stepped section.

The upper shell may have a flange section that protrudes toward an inner side in the radial direction in an intermediate section in the axial direction. In this case, the stepped section is configured by the flange section.

The suspension device of the present invention may have a bump stopper that has an outer diameter dimension equal to or less than the inner diameter dimension of the stepped section (flange section), and preferably less than the inner diameter dimension of the stepped section (flange section), and is arranged around a part on the other side in the axial direction of the ball screw shaft, and has an outer circumferential surface that comes in contact with or closely faces an inner circumferential surface of the stepped section (flange section).

The suspension device of the present invention may include a stopper holder that is internally fitted with a part on the other side in the axial direction of the bump stopper.

The stopper holder may have an annular section that is held between the stepped section (flange section) and a side surface on the one side in the axial direction of the bearing unit, and a cylindrical section that is bent toward the one side in the axial direction from an end section on the inner side in the radial direction of the annular section and is internally fitted with a part on the other side in the axial direction of the bump stopper.

The ball screw shaft may have a lower stepped section around an outer circumferential surface of an intermediate section in the axial direction that faces the other side in the axial direction. The bearing unit may be positioned in the axial direction with respect to the ball screw shaft by the end surface on the one side in the axial direction being brought into contact with the lower stepped section.

The assembly method for a suspension device according to an aspect of the present invention is applied when assembling the suspension device according to one aspect of the present invention. Particularly, the assembly method for a suspension device according to an aspect of the present invention includes a process of positioning the ball screw shaft in the axial direction with respect to the upper shell by arranging the balls and the ball nut around a part on the one side in the axial direction of the ball screw shaft, and together with joining and fastening the inner tube to the ball nut, externally fitting and fastening the bearing unit around a part on the other side in the axial direction of the ball screw shaft to form an intermediate assembly, then inserting the intermediate assembly into the inner side of the upper shell from an opening on the other side in the axial direction of the upper shell starting with an end section on the one side in the axial direction of the intermediate assembly, passing the ball nut and the inner tube through the inner side in the radial direction of the stepped section, and bringing the side surface on the one side in the axial direction of the part on the outer side in the radial direction of the bearing unit that is externally fitted with and fastened to the ball screw shaft in direct contact with or in contact through another member with the side surface on the other side in the axial direction of the stepped section.

Advantageous Effects of Invention

With the suspension device according to an aspect of the present invention, assembly work can be performed easily, and it is possible to easily secure the contractible amount of a coil spring thereof.

DESCRIPTION OF EMBODIMENTS

An example of an embodiment of the present invention will be described using FIG. 1 to FIG. 7.

Figure 1:
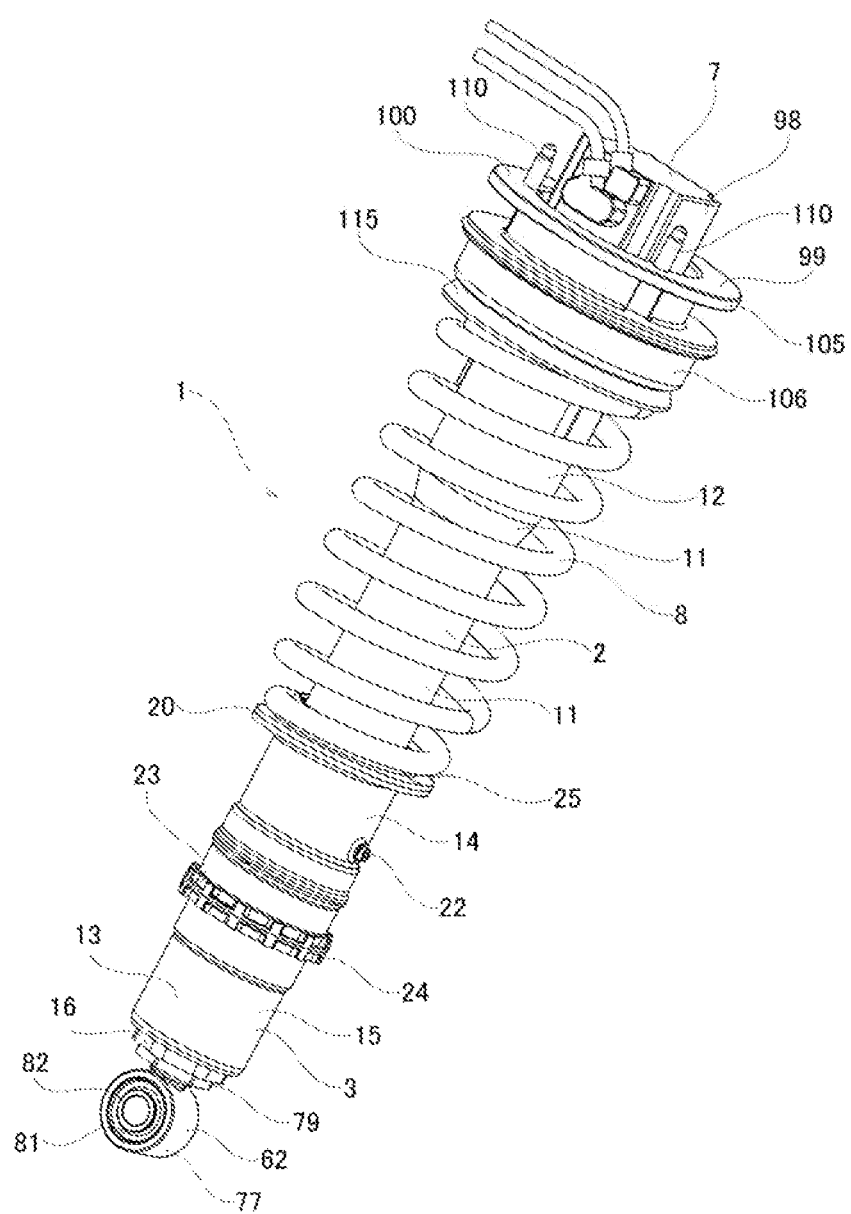
FIG. 1 is a perspective view of an example of a suspension device of an embodiment of the present invention.

The construction of a suspension device 1 of this example will be described using FIG. 1 to FIG. 3. The suspension device 1 of this example includes an upper shell 2, a lower shell 3, a ball screw shaft 4, a bearing unit 5, a ball nut 6, a plurality of balls 123, an inner tube 61, an electric motor 7, and a coil spring 8.

The upper shell 2 extends from one side in the axial direction to the other side in the axial direction, has a tubular shape that is open on both sides in the axial direction, and has a stepped section 122 around the inner circumferential surface of an intermediate portion in the axial direction. The stepped section 122 has at least a side surface on the other side in the axial direction that faces the other side in the axial direction. In this example, the upper shell 2 has a stepped cylindrical shape and is configured by: a small-diameter tubular section 10 that is positioned on the one side in the axial direction; a large-diameter tubular section 11 that is positioned on the other side in the axial direction; and a conical tubular section 12, the diameter of which becomes larger as going toward the other side in the axial direction, and that connects the end section on the other side in the axial direction of the small-diameter tubular section 10 and the end section on the one side in the axial direction of the large-diameter tubular section 11. The upper shell 2 is configured in a stepped cylindrical shape that is continuous in the circumferential direction. In other words, the upper shell 2 is not divided in the circumferential direction and is configured by an entirely integrated body. The large-diameter tubular section 11 has a flange section 9 that is formed around the inner circumferential surface of a part of the one side in the axial direction, and that protrudes toward the inner side in the radial direction. In this example, the stepped section 122 is configured by the flange section 9. However, the inner circumferential surface of the conical tubular section 12 may be configured so as to extend to the one side in the axial direction from the inner-end portion in the radial direction of the stepped section 122, or in other words, the inner circumferential surface of the conical tubular section 12 and the inner circumferential surface of the small-diameter tubular section 10 may be configured by the same cylindrical surface; or the conical tubular section 12 may be omitted and the small-diameter tubular section 10 may be configured so as to extend to the one side in the axial direction from the inner-end portion in the radial direction of the stepped section 122, or in other words, the small-diameter tubular section 10 and the large-diameter tubular section 11 may be connected by an annular-shaped stepped section.

Figure 2:
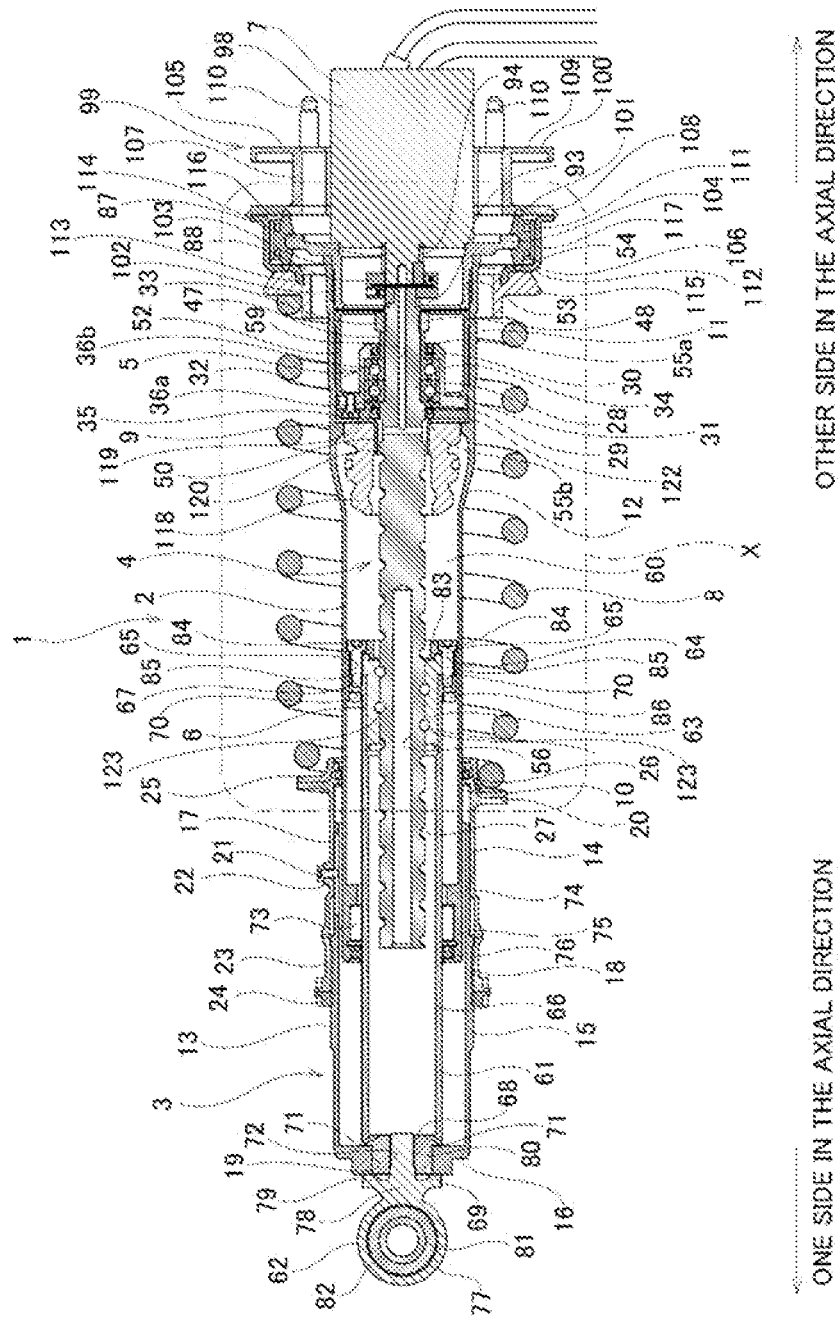
FIG. 2 is a cross-sectional view of the suspension device illustrated in FIG. 1.
Figure 3:
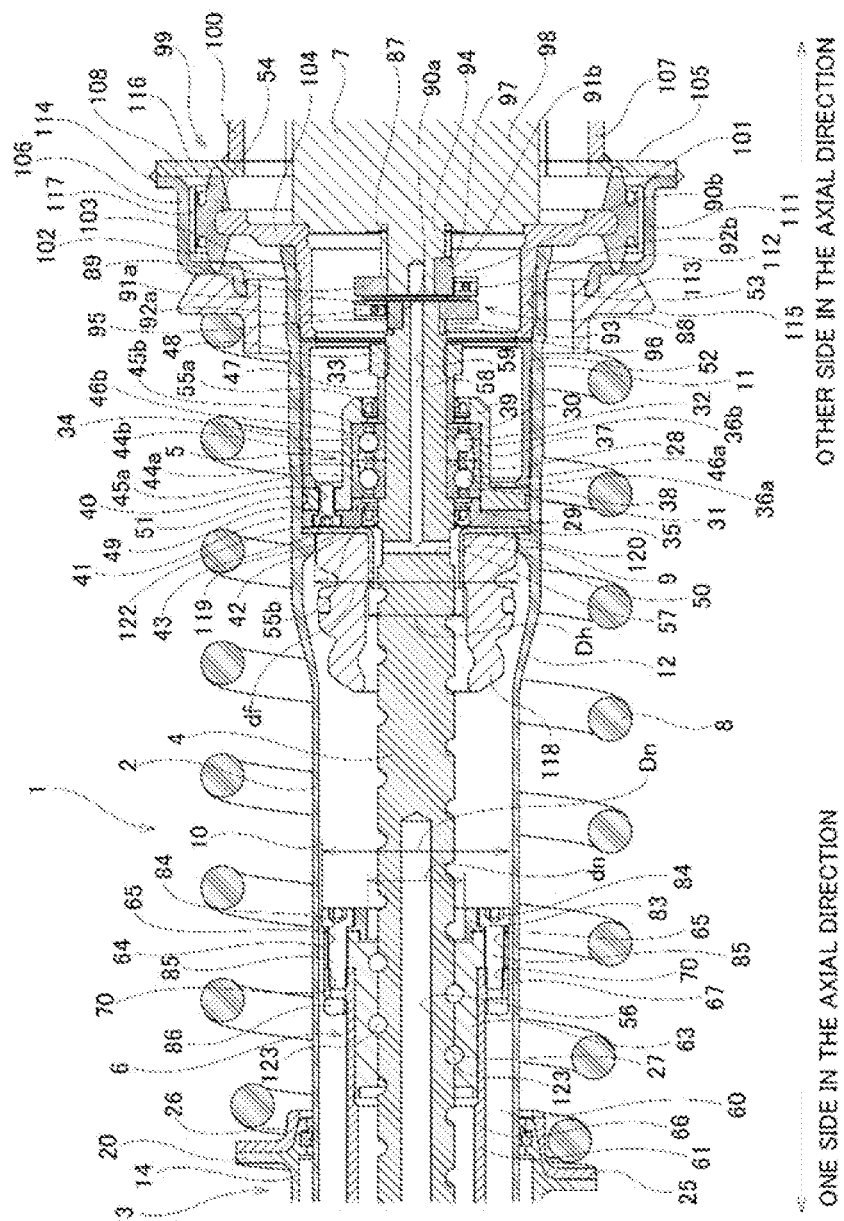
FIG. 3 is an enlarged view of section X in FIG. 2.

Note that in regard to the suspension device 1, the one side in the axial direction is the wheel side, or in other words, is the lower side when assembled in the vehicle, and is the lower left side in FIG. 1 and FIG. 4 to FIG. 7, and the left side in FIG. 2 and FIG. 3, and the other side in the axial direction is the vehicle body side, or in other words, is the upper side when assembled in the vehicle, and is the upper right side in FIG. 1 and FIG. 4 to FIG. 7, and the right side in FIG. 2 and FIG. 3.

The lower shell 3 is coaxially arranged with the upper shell 2, and has a tubular shape. The lower shell 3 is arranged around a part on the one side in the axial direction of the upper shell 2, and is able to displace in the axial direction relative to the upper shell 2, but is not able to rotate. In other words, the upper shell 2 and the lower shell 3 are combined so that the entire length is able to extend or contract. In this example, the lower shell 3 includes a shell body 13, and a lower retainer 14.

The shell body 13 includes a tubular section 15, and a bottom section 16 that covers an opening on the one side in the axial direction of the tubular section 15.

The tubular section 15 has an elongated hole 17 that extends in the axial direction, and has a male screw section 18 formed around the outer circumferential surface of an intermediate portion in the axial direction.

The bottom section 16, in the central portion, has an engaging hole 19 having a non-circular opening shape. In this example, the inner circumferential surface of the engaging hole 19 is configured by a pair of flat surfaces that are parallel with each other, and a pair of concave curved surfaces that connect the pair of flat surfaces. Alternatively, the engaging hole 19 may be configured by a spline hole, or a polygonal hole such as a rectangular hole or the like.

The lower retainer 14 has a tubular shape. The lower retainer 14, on the end section on the other side in the axial direction, has a circular outward-facing flange section 20 that protrudes toward the outer side in the radial direction, and in an intermediate portion in the axial direction, has a screw hole 21 that penetrates in the radial direction. By arranging and engaging the tip-end section of a bolt 22 that is screwed into the screw hole 21 on the inner side of the elongated hole 17 of the shell body 13, the lower retainer 14 is supported around the end section on the other side in the axial direction of the shell body 13 in a state in which rotation is prevented.

The end section on the one side in the axial direction of the lower retainer 14 is brought into contact with the end section on the other side in the axial direction of a first lock nut 23 that is screwed onto the male screw section 18 of the shell body 13. As a result, displacement toward the one side in the axial direction of the lower retainer 14 with respect to the shell body 13 is prevented. In this example, by bringing the end section on the other side in the axial direction of a second locking nut 24 that is screwed onto the male screw section 18 of the shell body 13 in contact with the end section on the one side of the first lock nut 23, it is possible to prevent the first lock nut 23 from becoming loose.

One end section in the axial direction of the coil spring 8 comes in contact with the side surface on the other side in the axial direction of the outward-facing flange section 20 of the lower retainer 14 through a seat 25 made of an elastic material. As a result, displacement toward the other side in the axial direction of the lower retainer 14 with respect to the shell body 13 is regulated.

The lower retainer 14 has a dust seal 26 around the inner circumferential surface of the end section on the other side in the axial direction. The dust seal 26, by the tip-end section being in sliding contact with the outer circumferential surface of the upper shell 2, prevents foreign matter such as muddy water and the like from penetrating from a space between the inner circumferential surface of the end section of the other side in the axial direction of the lower shell 3 and the outer circumferential surface of the upper shell 2.

The ball screw shaft 4 has a male ball screw groove 27 around the outer circumferential surface of a part on the one side in the axial direction, and is rotatably supported inside the upper shell 2. In this example, the male ball screw groove 27 is formed in a spiral shape around the outer circumferential surface of the ball screw shaft 4 from the end section on the one side in the axial direction to a part that is located further on the one side in the axial direction than the flange section 9. The ball screw shaft 4 has a supported section 28 provided on a part on the other side in the axial direction. The supported section 28 of the ball screw shaft 4 is rotatably supported by a bearing unit 5 so as to be able to rotate with respect to the inner circumferential surface of the large-diameter tubular section 11 of the upper shell 2.

The supported section 28 has a large-diameter section 29 on the one side in the axial direction, a small-diameter section 30 on the other side in the axial direction, and a lower stepped section 31 facing the other side in the axial direction and connecting the outer circumferential surface of the end section on the other side in the axial direction of the large-diameter section 29 and the outer circumferential surface of the end section on the one side in the axial direction of the small-diameter section 30. The small-diameter section 30 has a cylindrical-surface section 32 on the outer circumferential surface of the end section on the one side in the axial direction, and a male screw section 33 on the outer circumferential surface of the end section on the other side in the axial direction.

The bearing unit 5 is arranged between a part on the other side in the axial direction of the ball screw shaft 4 and the upper shell 2. The bearing unit 5 has a part on the outer side in the radial direction that is prevented from rotating with respect to the upper shell 2, and that is provided with a side surface on the one side in the axial direction that comes in direct contact with or comes in contact through another member with a side surface on the other side in the axial direction of the stepped section 122. The bearing unit 5 rotatably supports the ball screw shaft 4 with respect to the upper shell 2. In this example, the bearing unit 5 includes a bearing holder 34, a pressing plate 35, and a pair of rolling bearings 36a, 36b.

The bearing holder 34 has a crank shaped cross-sectional shape. More specifically, the bearing holder 34 includes a holder cylinder section 37, an outward-facing flange section 38 that is bent toward the outer side in the radial direction from the outer circumferential surface of the end section on the one side in the axial direction of the holder cylinder section 37, and an inward-facing flange section 39 that is bent toward the inner side in the radial direction from the inner circumferential surface of the end section on the other side in the axial direction of the holder cylinder section 37. The outward-facing flange section 38 has screw holes 40 at a plurality of locations in the circumferential direction that penetrate in the axial direction.

The pressing plate 35 has an L-shaped cross-sectional shape. More specifically, the pressing plate 35 includes an annular section 41, and a plate cylinder section 42 that is bent toward the other side in the axial direction from the end section on the inner side in the radial direction of the annular section 41. The annular section 41 has through holes 43 at a plurality of locations in the circumferential direction that penetrate in the axial direction. The annular section 41 has an outer diameter dimension that is larger than the inner diameter dimension of the flange section 9 of the upper shell 2, and capable of being internally fitted with the inner circumferential surface of the large-diameter tubular section 11 of the upper shell 2 without looseness (slightly smaller than the inner diameter dimension of the large-diameter tubular section 11). The plate cylinder section 42 has an outer diameter dimension capable of being internally fitted with the end section on the one side in the axial direction of the holder cylinder section 37 of the bearing holder 34 without looseness.

The pair of rolling bearings 36a, 36b includes inner rings 44a, 44b, outer rings 45a, 45b, and a plurality of rolling bodies 46a, 46b. The pair of rolling bearings 36a, 36b is configured by angular ball bearings that use balls as the rolling bodies 46a, 46b, and in which contact angles are given to the rolling bodies 46a, 46b.

Front face-to-face duplex type (DF) contact angles are given to the rolling bodies 46a, 46b of the pair of rolling bearings 36a, 36b. As a result, the support rigidity of the ball screw shaft 4 is adjusted, and pivotal displacement of the ball screw shaft 4 is allowed to a certain extent based on a horizontal force that acts from the wheel. In other words, compared with a case where a back-to-back duplex type (DB) contact angles are applied, the allowable pivotal contact angle of the ball screw shaft 4 is increased. Note that the pair of rolling bearings can be configured by a pair of conical roller bearings that use conical rollers as the rolling bodies.

The inner rings 44a, 44b of the pair of rolling bearings 36a, 36b, in a state where the end surfaces in the axial direction face each other come in contact with each other, are externally fitted by press fitting with a part on the one side in the axial direction of the cylindrical-surface section 32 of the ball screw shaft 4, and are supported in the axial direction between the lower stepped section 31 and a collar 47 that is externally fitted with a part on the other side in the axial direction of the cylindrical-surface section 32. In other words, the end surface on the one side in the axial direction of the inner ring 44a of the rolling bearing 36a on the one side in the axial direction is brought into contact with the lower stepped section 31, and the end surface on the one side in the axial direction of the collar 47 is brought into contact with the end surface on the other side in the axial direction of the inner ring 44b of the rolling bearing 36b on the other side in the axial direction. As a result, the bearing unit 5 is positioned in the axial direction with respect to the ball screw shaft 4. The collar 47 is configured entirely into a cylindrical shape using a low-friction material such as an oil-impregnated metal or the like, and is prevented from displacement toward the other side in the axial direction by a nut 48 that is screwed onto the male screw section 33 of the ball screw shaft 4. With this configuration, it is possible to position the inner rings 44a, 44b in the axial direction with respect to the ball screw shaft 4.

The outer rings 45a, 45b of the pair of rolling bearings 36a, 36b, in a state in which the end surfaces in the axial direction facing each other are brought in contact with each other, are internally fitted by pressure fitting with the holder cylinder section 37 of the bearing holder 34, and are held in the axial direction between the side surface on the one side in the axial direction of the inward-facing flange section 39 and the end surface on the other side in the axial direction of the plate cylinder section 42 of the pressing plate 35. In other words, the end surface on the one side in the axial direction of the outer ring 45a of the rolling bearing 36a on the one side in the axial direction is brought into contact with the end surface on the other side in the axial direction of the plate cylinder section 42, and the side surface on the one side in the axial direction of the inward-facing flange section 39 is brought into contact with the side surface on the other side in the axial direction of the outer ring 45b of the rolling bearing 36b on the other side in the axial direction.

The bearing holder 34 and pressing plate 35 are joined and fixed by screwing bolts 49 that have been inserted through holes 43 into screw holes 40, in a state in which the outer rings 45a, 45b of the pair of rolling bearings 36a, 36b are held in the axial direction between the side surface on the one side in the axial direction of the inward-facing flange section 39 and the end surface on the other side in the axial direction of the plate cylinder section 42.

The pressing plate 35 is such that the outer circumferential surface of the annular section 41 internally fits with the inner circumferential surface of the large-diameter tubular section 11 of the upper shell 2 without looseness, and causes the side surface on the one side in the axial direction of the annular section 41, and more specifically, the end section on the outer side in the radial direction thereof, to come in contact with the side surface on the other side in the axial direction of the flange section 9 of the stepped section 122 of the upper shell 2 through a stopper holder 50.

The bearing holder 34 is prevented from rotating with respect to the large-diameter tubular section 11 by an O-ring 51 fastened to the outer circumferential surface of the outward-facing flange section 38 coming in elastic contact with the inner circumferential surface of the large-diameter tubular section 11. Moreover, the end section on the one side in the axial direction of a sleeve 52 that is internally fitted with the large-diameter tubular section 11 of the upper shell 2 without looseness is brought into contact with the end section on the outer side in the radial direction of the side surface on the other side in the axial direction of the outward-facing flange section 38 of the bearing holder 34. The sleeve 52 is prevented from displacement toward the other side in the axial direction by a locking nut 54 that is screwed into a female screw section 53 that is provided around the inner circumferential surface of the end section on the other side in the axial direction of the large-diameter tubular section 11.

Note that the bearing holder 34 has an oil seal 55a around the inner circumferential surface of the inward-facing flange section 39, the tip-end section of which comes in sliding contact with the outer circumferential surface of the collar 47, and the pressing plate 35 has an oil seal 55b around the inner circumferential surface, the tip-end section of which comes in sliding contact with the outer circumferential surface of the large-diameter section 29 of the ball screw shaft 4. As a result, grease that lubricates each of the pair of rolling bearings 36a, 36b is prevented from leaking from a space between the inner rings 44a, 44b and outer rings 45a, 45b.

In this example, the ball screw shaft 4 is rotatably supported on the inner side of the upper shell 2 by a bearing unit 5 that is configured as described above. In other words, in this example, the outer rings 45a, 45b of the pair of rolling bearings 36a, 36b, the bearing holder 34, and the pressing plate 35 form a part on the outer side in the radial direction. Moreover, the side surface on the one side in the axial direction of the annular section 41 of the pressing plate 35 corresponds to a side surface on the one side in the axial direction of the part on the outer side in the radial direction. Furthermore, the stopper holder 50 corresponds to another member. However, in the present invention, the configuration of the bearing unit 5 is not limited to the construction described above. For example, in the configuration of the rolling bearings of the bearing unit 5, instead of the pair of rolling bearings in the construction described above, various kinds of known construction may be used, including single and paired configurations. In addition, for the bearing unit 5, it is possible to use various kinds of known construction in which the ball screw shaft 4 can be rotatably supported with respect to the upper shell 2, such as a configuration in which the outer rings, bearing holder and/or pressing plate are integrated, a configuration in which the inner rings are omitted and rolling bodies are arranged between the outer rings and the cylindrical-surface section 32 of the ball screw shaft 4, and the like.

The ball screw shaft 4, in an area from the end section on the one side in the axial direction to the intermediate section in the axial direction has a bottomed hole 56 that is open to the end surface on the one side in the axial direction. The bottomed hole 56 is provided in order to increase the volume on the inner side of the inner tube 61, which suppress an effect due to an increase or decrease in volume of the space on the inner side of the inner tube 61 due to the expansion or contraction over the entire length of the suspension device 1. Moreover, the ball screw shaft 4 has a ventilation path 59 that is composed of a ventilation hole 57 in the radial direction that penetrates in the radial direction through the intermediate section in the axial direction, and a ventilation hole 58 in the axial direction that opens to the end surface on the other side in the axial direction and to the ventilation hole 57 in the radial direction. The ventilation path 59 is provided in order to increase the volume of an internal space 60 existing on the inner side of the upper shell 2 and lower shell 3, which suppresses an effect due to an increase or decrease in volume of the internal space 60 due to the expansion or contraction over the entire length of the suspension device 1. The bottomed hole 56 and the ventilation path 59 contribute to making the ball screw shaft 4 more lightweight.

A ball nut 6 has a female ball screw groove (not illustrated) around the inner circumferential surface, and screws onto the ball screw shaft 4. In this example, the ball nut 6 includes a cylindrical main body section 63 and a nut flange section 64 that protrudes toward the outer side in the radial direction from the end section on the other side in the axial direction of the main body section 63. The female ball screw groove is provided around the inner circumferential surface of the main body section 63. The nut flange section 64 has through holes 65 at a plurality of locations in the circumferential direction that penetrate in the axial direction. The ball nut 6 is arranged around a part on the one side in the axial direction of the ball screw shaft 4 where the male ball screw groove 27 is formed around the outer circumferential surface, and is supported with respect to the lower shell 3 so as to be able to integrally displace in the axial direction.

A plurality of balls 123 are arranged so as to be able to freely roll in a space between the male ball screw groove 27 of the ball screw shaft 4 and the female ball screw groove of the ball nut 6. As a result, the ball nut 6 that is arranged around a part on the one side in the axial direction of the ball screw shaft 4 is screwed onto the ball screw shaft 4. Note that the balls 123 are circulated by a circulation mechanism (not illustrated). In other words, the ball screw mechanism is configured by the ball screw shaft 4, the ball nut 6, the plurality of balls 123, and the circulation mechanism. Examples of a circulation mechanism may include a return tube, a deflector, an end cap, an end deflector, an external return, a return deflector, and the like.

The inner tube 61 is joined to the lower shell 3 and the ball nut 6. As a result, the inner tube 61 connects the lower shell 3 and the ball nut 6 so as to be able to integrally displace in the axial direction. More specifically, in this example, the ball nut 6 is connected with respect to the lower shell 3 by the inner tube 61 and a lower bushing 62 so as to be able to integrally displace in the axial direction.

The inner tube 61 includes a cylindrical section 66, a tube flange section 67 that protrudes toward the outer side in the radial direction of the end section on the other side in the axial direction of the cylindrical section 66, a bottom section 68 that is bent toward the inner side in the radial direction from the end section on the one side in the axial direction of the cylindrical section 66, and an engaging shaft section 69 that protrudes toward the one side in the axial direction from the side surface on the one side in the axial direction of the bottom section 68.

The tube flange section 67 has screw holes 70 at a plurality of locations in the circumferential direction that open to the side surface on the other side in the axial direction.

The bottom section 68 has ventilation holes 71 at a plurality of locations in the circumferential direction that open to the end section on the outer side in the radial direction of the side surface on the one side in the axial direction and to the middle section in the radial direction of the side surface on the other side in the axial direction. The ventilation holes 71 are provided in order for the space on the inner side of the inner tube 61 to communicate with the internal space 60, which suppresses an effect due to an increase or decrease in volume in the space on the inner side of the inner tube 61 due to expansion or contraction over the entire length of suspension device 1.

An engaging shaft section 69 has an external surface shape that allows the engaging shaft section 69 to internally fit with the engaging hole 19 of the lower shell 3 without looseness. In other words, the engaging shaft section 69 has an external surface shape that is complementary with the inner circumferential surface of the engaging hole 19 of the lower shell 3. In this example, the external surface shape of the engaging shaft section 69 is configured by a pair of flat surfaces that are parallel with each other, and a pair of convex curved surfaces that connect the pair of flat surfaces.

The inner tube 61 has a screw hole 72 that penetrated in the axial direction through the bottom section 68 and engaging shaft section 69.

The inner tube 61 is arranged on the inner side of the small-diameter tubular section 10 of the upper shell 2 such that relative displacement in the axial direction with respect to the upper shell 2 is possible. In order for this, a slide bearing (wear ring) 73 is supported by the inner circumferential surface of a part of the one side in the axial direction of the small-diameter tubular section 10, and the inner tube 61 is inserted (internally fitted) into the inner side of the slide bearing 73. The slide bearing 73 is held from both sides in the axial direction by an inward-facing flange section 74 that is provided on the small-diameter tubular section 10 and a retaining ring 75 that is fastened to the inner circumferential surface of the small-diameter tubular section 10. Note that the upper shell 2 has an oil seal 76 on the end section on the one side in the axial direction of the small-diameter tubular section 10 that allows the tip-end section to slide over the outer circumferential surface of the inner tube 61.

The ball nut 6 is joined with and fastened to the inner tube 61 by screwing bolts 85 that are inserted through through holes 84 provided at a plurality of locations in the circumferential direction of disc shaped contact plate 83 and through holes 65 of the nut flange section 64 into screw holes 70 of the tube flange section 67. Note that the inner tube 61, on the side surface on the one side in the axial direction of the tube flange section 67, has an annular shaped rebound stopper 86 made of an elastic material that includes an elastomer such as rubber or the like. As a result, in a case where the lower shell 3 is pulled downward by the weight of the wheel and the ball nut 6 moves to the one side in the axial direction when the vehicle is lifted up or the like during inspection and maintenance, the end surface on the one side in the axial direction of the ball nut 6 is prevented from coming in direct metal contact with the side surface on the other side in the axial direction of the inward-facing flange section 74 of the upper shell 2.

In this example, in a state in which the ball nut 6 and the inner tube 61 are joined by the bolts 85, the ball nut 6 and the inner tube 61 are able to pass through the inner side in the radial direction of the stepped section 122 (flange section 9) of the upper shell 2. In other words, the circumscribed circle diameter $D_n$ of the ball nut 6 and the inner tube 61 (the joined body of these) is less than the inner diameter dimension $d_f$ of the stepped section 122 (flange section 9) ($D_n < d_f$). Moreover, the inner diameter dimension of the small-diameter tubular section of the upper shell 2 is greater than the circumscribed circle diameter $D_n$ of the ball nut 6 and inner tube 61 (joined body of these) and less than the inner diameter dimension $d_f$ of the stepped section 122.

In this example, a lower bushing 62 is provided. The lower bushing 62 has a function of supporting a wheel on the end section on the one side in the axial direction of the lower shell 3, and a function connecting the ball nut 6 together with the inner tube 61 to the lower shell 3. The lower bushing 62 includes an annular section 77, a shaft section 78 that protrudes toward the other side in the axial direction from the end section on the other side in the axial direction of the annular section 77, and a pressing flange section 79 that protrudes toward the outer side in the radial direction from a part on the one side in the axial direction of the shaft section 78. The shaft section 78 has a male screw section 80 around the outer circumferential surface of the end section on the other side in the axial direction.

The lower bushing 62 includes an annular shaped elastic member 81 that is made of an elastomer such as rubber or the like and is held on the inner side of the annular section 77, and an annular shaped support ring section 82 that is held on the inner side of the elastic member 81.

The inner tube 61 is such that the engaging shaft section 69 is internally fitted in the engaging hole 19 of the lower shell 3 with no looseness, and the side surface on the one side in the axial direction of the bottom section 68 comes in contact with the side surface on the other side in the axial direction of the bottom section 16 of the lower shell 3. In this state, the inner tube 61 is joined and fastened to the lower shell 3 by screwing the male screw section 80 of the lower bushing 62 into the screw hole 72 of the inner tube 61, and pressing the side surface on the one side in the axial direction of the bottom section 16 of the lower shell 3 by the pressing flange section 79 of the lower bushing 62. In other words, the bottom section 16 of the lower shell 3 is held in the axial direction between the bottom section 68 of the inner tube 61 and the pressing flange section 79 of the lower bushing 62. However, it is also possible to join the inner tube 61 with the lower shell 3 by using a member other than the lower bushing 62, or by a fitting means or the like.

The electric motor 7 has an output shaft 87, the tip-end section (end section on the one side in the axial direction) of which is connected to the end section on the other side in the axial direction of the ball screw shaft 4 so as to be able to transmit torque, and is supported by the end section on the other side in the axial direction of the upper shell 2.

The output shaft 87 is connected to the end section on the other side in the axial direction of the ball screw shaft 4 by a joint 88 so as to be able to transmit torque.

In this example, the joint 88 includes a cylindrical shaped coupling 89 and a pair of dowels 90a, 90b.

Of the pair of dowels 90a, 90b, the dowel 90a on the one side in the axial direction spans between the end section on the other side in the axial direction of the ball screw shaft 4 and the coupling 89. More specifically, the dowel 90a on the one side in the axial direction joins the end section on the other side in the axial direction to the coupling 89, and engages with a notch 91a that is provided on the end section on the other side in the axial direction of the ball screw shaft 4. The notch 91a opens to the outer circumferential surface of the end section on the other side in the axial direction and to the end surface on the other side in the axial direction of the ball screw shaft 4. The dowel 90a on the one side in the axial direction is prevented from falling out from notch 91 by a joining member 92a such as a set screw or the like that passes in the radial direction through the dowel 90a, the tip-end section of which engages with the bottom section of the notch 91a.

Of the pair of dowels 90a, 90b, the dowel 90b on the other side in the axial direction spans between the end section on the one side in the axial direction of the output shaft 87 of the electric motor 7 and the coupling 89. More specifically, the dowel 90b on the other side in the axial direction joins the end section on the one side in the axial direction to the coupling 89, and engages with a notch 91b that is provided on the end section on the one side in the axial direction of the output shaft 87. The notch 91b opens to the outer circumferential surface of the end section on the one side in the axial direction and the end surface on the one side in the axial direction of the output shaft 87. The dowel 90b on the other side in the axial direction is prevented from falling out from the notch 91b by a joining member 92b such as a set screw or the like that passes in the radial direction through the dowel 90b, the tip-end section of which engages with the bottom section of the notch 91b.

In this example, a lower collar 93 externally fits with the end section on the other side in the axial direction of the ball screw shaft 4, and an upper collar 94 externally fits with a part on the other side in the axial direction of the output shaft 87 of the electric motor 7. The lower collar 93 causes a notch 95 provided on the end section on the other side in the axial direction to engage with the dowel 90a on the one side in the axial direction, causes the end surface on the one side in the axial direction to come in contact with or closely face an upper stepped section 96 that is provided on the ball screw shaft 4, and causes the end surface on the other side in the axial direction to come in contact with or closely face the side surface on the one side in the axial direction of the coupling 89. The upper collar 94 causes a notch 97 provided on the end section on the one side in the axial direction to engage with the dowel 90b on the other side in the axial direction, causes the end surface on the one side in the axial direction to come in contact with or closely face the side surface on the other side in the axial direction of the coupling 89, and causes the end surface on the other side in the axial direction to come in contact with or closely face the side surface on the one side in the axial direction of a casing 98 of the electric motor 7. As a result, even in a case where the joining members 92a, 92b become loose, the position in the axial direction of the coupling 89 is prevented from shifting.

Note that in regard to the construction of the joint 88, the construction is not limited to that described above, and various kinds of known construction may be used.

In this example, the electric motor 7 is supported by and fastened to the end section on the other side in the axial direction of the upper shell 2 by a bracket 99. The bracket 99 includes a locking nut 54, a mounting member 100, and an anti-vibration member 101.

The locking nut 54 includes a tubular section 103 having a male screw section 102 around the outer circumferential surface on the one side in the axial direction, and an annular section 104 that is bent toward the outer side in the radial direction from the end section on the other side in the axial direction of the cylindrical section 103. The locking nut 54 is joined and fastened to the upper shell 2 by screwing the male screw section 102 into the female screw section 53 of the upper shell 2. The electric motor 7 is supported by and fastened by fastening the casing 98 to the annular section 104 of the locking nut 54 using bolts or the like.

The mounting member 100 includes an upper member 105 and a lower member 106.

The upper member 105 has a U-shaped cross-sectional shape. More specifically, the upper member 105 includes a cylindrical section 107, a lower annular section 108 that is bent toward the outer side in the radial direction from the end section on the one side in the axial direction of the cylindrical section 107, and an upper annular section 109 that is bent toward the outer side in the radial direction from the end section on the other side in the axial direction of the cylindrical section 107. The suspension device 1 of this example is joined and fastened to the vehicle body by support bolts 110 that are inserted from the one side in the axial direction through through holes that are provided at a plurality of locations in the circumferential direction of the upper annular section 109.

The lower member 106 has a crank shaped cross-sectional shape. More specifically, the lower member 106 includes a cylindrical section 111, an annular section 112 that is bent toward the inner side in the radial direction from the end section on the one side in the axial direction of the cylindrical section 111, a bent section 113 that is bent toward the one side in the axial direction from the end section on the inner side in the radial direction of the annular section 112, and an outward-facing flange section 114 that is bent toward the outer side in the radial direction from the end section on the other side in the axial direction of the cylindrical section 111.

The end section on the other side in the axial direction of the coil spring 8 comes in contact with the end surface on the one side in the axial direction of the annular section 112 of the lower member 106 through an end member 115. The end member 115 is made of an elastic material that includes an elastomer such as rubber or the like, embeds the bent section 113 of the lower member 106, and covers the side surface on the one side in the axial direction of the annular section 112.

The upper member 105 and the lower member 106 are joined and fastened together by a joining means such as welding or the like in a state in which the end section on the outer side in the radial direction of the side surface on the one side in the axial direction of the lower annular section 108 is in contact with the side surface on the other side in the axial direction of the outward-facing flange section 114.

The anti-vibration member 101 includes an elastic member 116 and a support member 117.

The elastic member 116 is made of an elastic material that includes an elastomer such as rubber or the like, and has a substantially rhombic cross-sectional shape that is symmetrical in the axial direction. The elastic member 116, by embedding the end section of the outer side in the radial direction of the annular section 104 of the locking nut 54, is supported by the locking nut 54.

The support member 117 has a cylindrical shape and is made of a metal, synthetic resin or the like having a higher rigidity than the elastic material of the elastic member 116. The support member 117 is supported around the elastic member 116 by welding the inner circumferential surface to the end section on the outer side in the radial direction of the elastic member 116. In other words, the elastic member 116 is provided so as to span between the annular section 104 of the locking nut 54 and the support member 117.

The support member 117 is internally fitted by pressure fitting with the cylindrical section 111 of the lower member 106, and the elastic member 116 is held in the axial direction between the lower annular section 108 of the upper member 105 and the annular section 112 of the lower member 106. In other words, the elastic member 116 elastically causes the end section on the one side in the axial direction to come in contact with the side surface on the other side in the axial direction of the annular section 112 of the lower member 106, and elastically causes the end section on the other side in the axial direction to come in contact with the side surface on the one side in the axial direction of the lower annular section 108 of the upper member 105. As a result, the upper shell 2, a member supported on the inner side or around the upper shell 2, and the electric motor 7 are supported by the vehicle body so as to be able to pivot about the center position in the axial direction of the elastic member 116.

The electric motor 7 is supported by and fastened to the bracket 99 in a state where a part on the outer side in the radial direction of the side surface on the one side in the axial direction of the casing 98 is in contact with a part on the inner surface in the radial direction of the side surface on the other side in the axial direction of the annular section 104 of the locking nut 54. As a result, the amount that the electric motor 7 protrudes toward the other side in the axial direction further than the mounting member 100 is suppressed by arranging a part on the one side in the axial direction on the inner side of the mounting member 100.

Note that the construction of the electric motor 7 and the construction for supporting the electric motor 7 by the end section on the other side in the axial direction of the upper shell 2 is not limited to the construction described above, and it is possible to use various kinds of known construction.

The coil spring 8 is arranged around the upper shell 2, and is held in an elastically compressed state in the axial direction between the upper shell 2 and the lower shell 3. More specifically, the coil spring 8 is held in an elastically compressed state in the axial direction between a seat 25 that is supported by a fastening means such as an attachment, adhesive or the like on the side surface on the other side in the axial direction of the outward-facing flange section 20 of the lower retainer 14, and the end member 115 that is supported by the upper shell 2 through the bracket 99.

The suspension device 1 of this example includes a cylindrical shaped bump stopper 118 that is made of an elastomer such as rubber, urethane or the like. The bump stopper 118 is supported around on the inner side of the conical tubular section 12 of the upper shell 2 and an intermediate section in the axial direction of the ball screw shaft 4 by a stopper holder 50. In a case where the ball nut 6 moves toward the other side in the axial direction due to an upward impact load that is applied to the end second on the one side in the axial direction of the lower shell 3 and the lower shell 3 move to the other side in the axial direction, the bump stopper 118 is pressed and squeezed by the contact plate 83. In other words, the bump stopper 118 is provided so as to absorb impact loads that are applied to the lower shell 3, and in order to prevent direct metal contact between the contact plate 83 and the side surface on the one side in the axial direction of the pressing plate 35 of the bearing unit 5.

The stopper holder 50 is configured by bending and forming a metal plate such as a steel plate or the like so as to have an L-shaped cross-sectional shape. In other words, the stopper holder 50 includes an annular section 119, and a cylindrical section 120 that is bent toward the one side in the axial direction from the end section on the inner side in the radial direction of the annular section 119. The stopper holder 50 is supported by the upper shell 2 by holding the annular section 119 in the axial direction between the flange section 9 of the upper shell 2 and the pressing plate 35 of the bearing unit 5.

The bump stopper 118 is supported around the ball screw shaft 4 by externally fitting the end section on the other side in the axial direction with the cylindrical section 120 of the stopper holder 50, and restricted from deforming toward the inner side in the radial direction when pressed and squeezed in the axial direction. In other words, in order that there is no contact with the outer circumferential surface of the ball screw shaft 4 even when pressed and squeezed in the axial direction, the inner circumferential surface of the part on the other side in the axial direction of the bump stopper 118 is externally fitted with the cylindrical section 120, and is processed and formed into the inner circumferential surface shape of the part on the one side in the axial direction.

In this example, the bump stopper 118 has an outer diameter dimension that is equal to or less than the inner diameter dimension of the flange section 9, and preferably has an outer diameter dimension that is slightly smaller than the inner diameter dimension of the flange section 9. As a result, the bump stopper 118 is such that the outer circumferential surface of the end section on the other side in the axial direction comes in contact with or closely faces the inner circumferential surface of the flange section 9 of the upper shell 2, and the bump stopper 118 is restricted from deforming toward the outer side in the radial direction when pressed and squeezed in the axial direction.

Note that the cylindrical section 120 of the stopper holder 50 has an outer diameter dimension $D_h$ that is smaller than the inner diameter dimension $d_n$ of the contact plate 83 that is supported by the end section on the other side in the axial direction of the ball nut 6 ($D_h < d_n$). Therefore, when the ball nut 6 moves to the other side in the axial direction due to an upward impact load being applied to the end section on the one side in the axial direction of the lower shell 3 and the bump stopper 118 is pressed and squeezed, the contact plate 83 is able to move to the other side in the axial direction until around the cylindrical section 120. In short, the amount of relative displacement in the axial direction of the lower shell 3 with respect to the upper shell 2 can be lengthened by an amount equal to the dimension in the axial direction of the contact plate 83.

In the suspension device 1 of this example, the end section on the other side in the axial direction of the upper shell 2 is supported by the vehicle body through a mounting member 100, and the end section on the one side in the axial direction of the lower shell 3 supports the wheel through the lower bushing 62. In other words, the suspension device 1 is supported so as to span between the vehicle body and the wheel in a state in which the upper shell 2 is arranged on the upper side and the lower shell 3 is arranged on the lower side.

The suspension device 1, due to a force in a direction that presses the lower shell 3 toward the one side in the axial direction (downward) with respect to the upper shell 2 caused by an elastic restoring force of the coil spring 8, presses the outer circumferential surface (tread) of a tire of the wheel against the road surface.

Moreover, the suspension device 1, by expanding or contracting over the entire length, absorbs vibration, impact and the like.

In other words, in the suspension device 1, when an upward force (upward pushing force) is applied to the end section on the one side in the axial direction of the lower shell 3 due to vibration, impact and the like from the road surface, the lower shell 3, together with causing the coil spring 8 to elastically contract, relatively displaces toward the other side in the axial direction with respect to the upper shell 2 while causing the ball screw shaft 4 and the output shaft 87 of the electric motor 7 to rotate and causing the ball nut 6 to move toward the other side in the axial direction (upper side). As a result, the entire length of the suspension device 1 contracts.

When an upward force due to vibration, impact and the like is released or reduced, the lower shell 3, due to a force in a direction that presses the lower shell 3 toward the one side in the axial direction (lower side) with respect to the upper shell 2 caused by the elastic restoring force of the coil spring 8, together with elastically restoring the coil spring 8, relatively displaces toward the one side in the axial direction with respect to the upper shell 2 while causing the ball screw shaft 4 and the output shaft 87 of the electric motor 7 to rotate, and causing the ball nut 6 to move toward the one side in the axial direction (lower side). As a result, the entire length of the suspension device 1 expands.

The suspension device 1 of this example, by controlling electric current flowing to the electric motor 7 according to the traveling state, condition of the road, and the like, is able to control the vehicle height, posture of the vehicle, and the dampening force.

By causing current to flow to the electric motor 7 to rotate and drive the output shaft 87 in a case of controlling the vehicle height and the posture of the vehicle, the ball screw shaft 4 is rotated and driven. As the ball screw shaft 4 rotates, the ball nut 6 moves in the axial direction, the lower shell 3 relatively displaces in the axial direction with respect to the upper shell 2, and the entire length of the suspension device 1 expands or contracts. As a result, the height of the vehicle body supporting the upper shell 2 through the mounting member 100 is adjusted with respect to the wheel supported by the lower shell 3 through the lower bushing 62.

In a case of controlling the dampening force, the rotating resistance of the output shaft 87 is adjusted by controlling the amount of current flowing to the electric motor 7, and the resistance to movement in the axial direction by the ball nut 6 is adjusted based on adjustment of the rotation resistance of the ball screw shaft 4. As a result, when the entire length of the suspension device 1 contracts due to vibration, impact and the like from the road surface, the dampening force can be adjusted by adjusting the speed of relative displacement in the axial direction of the lower shell 3 with respect to the upper shell 2.

The assembly method for the suspension device 1 of this example will be described using FIG. 4 to FIG. 7.

Figure 4:
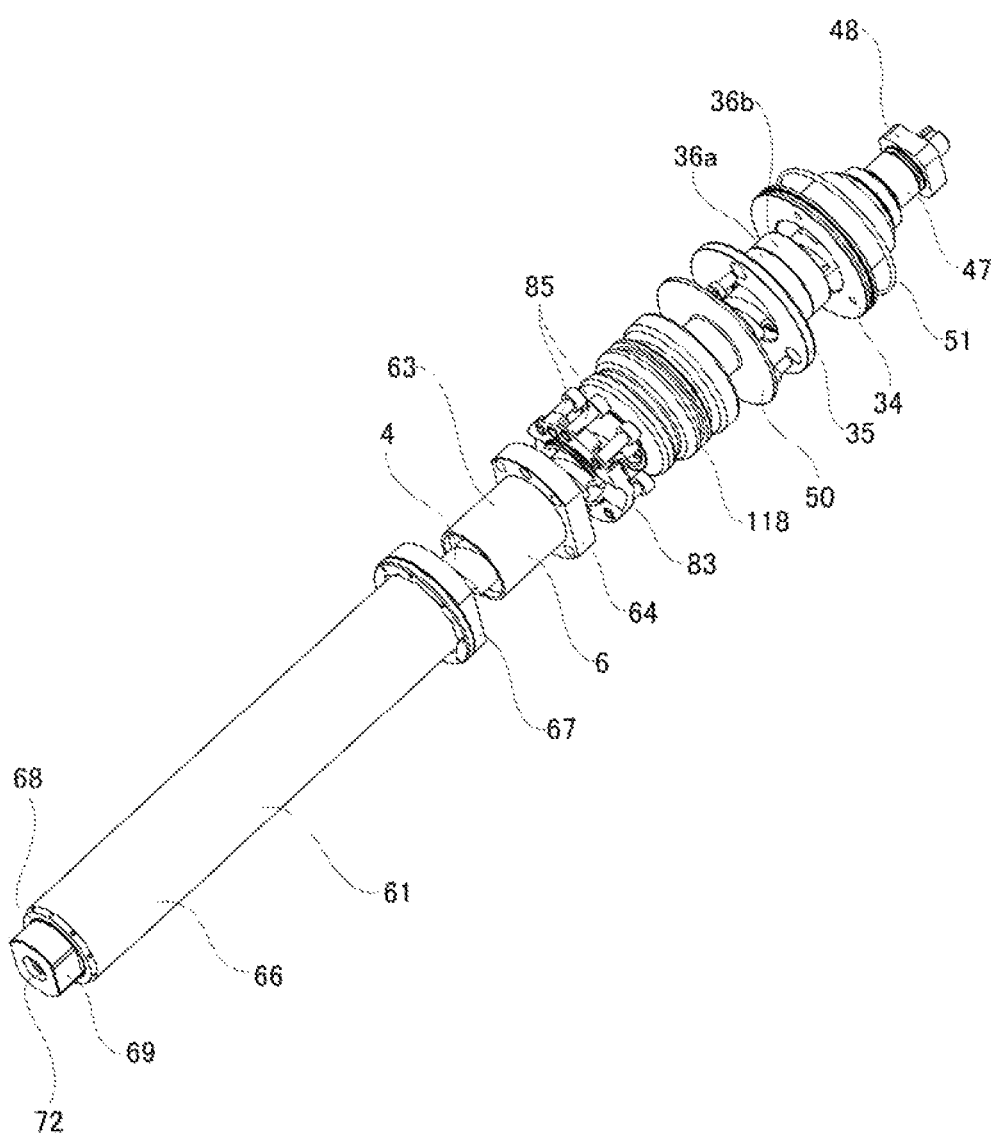
FIG. 4 is an exploded perspective view of an intermediate assembly.

First, as illustrated in FIG. 4, the plurality of balls 123 and the ball nut 6 are arranged around a part on the one side in the axial direction of the ball screw shaft 4, and the inner tube 61 is joined and fastened to the ball nut 6. Moreover, the bump stopper 118 is arranged around an intermediate section in the axial direction of the ball screw shaft 4, and the bearing unit 5 is arranged around a part on the other side in the axial direction of the ball screw shaft 4. In other words, an intermediate assembly 124 is formed by combining the ball screw shaft 4, the bearing unit 5, the ball nut 6, and the bump stopper 118.

More specifically, first, the ball nut 6 is screwed onto a part on the one side in the axial direction of the ball screw shaft 4 where the male ball screw groove 27 is provided, through the plurality of balls 123. Next, the bolts 85 are inserted through the through holes 84 of the contact plate 83 and the through holes 65 of the ball nut 6, and furthermore, by screwing the bolts 85 into the screw holes 70 of the tube flange section 67, the ball nut 6 and the inner tube 61 are joined and fastened together. Moreover, the ball screw shaft 4 is inserted from the one side in the axial direction into the bump stopper 118 that is externally fitted with the stopper holder 50, and the bearing unit 5 and the collar 47 are externally fitted with a part on the other side in the axial direction of the ball screw shaft 4. Furthermore, the nut 48 is screwed onto the end section on the other side in the axial direction of the ball screw shaft 4.

Figure 5:
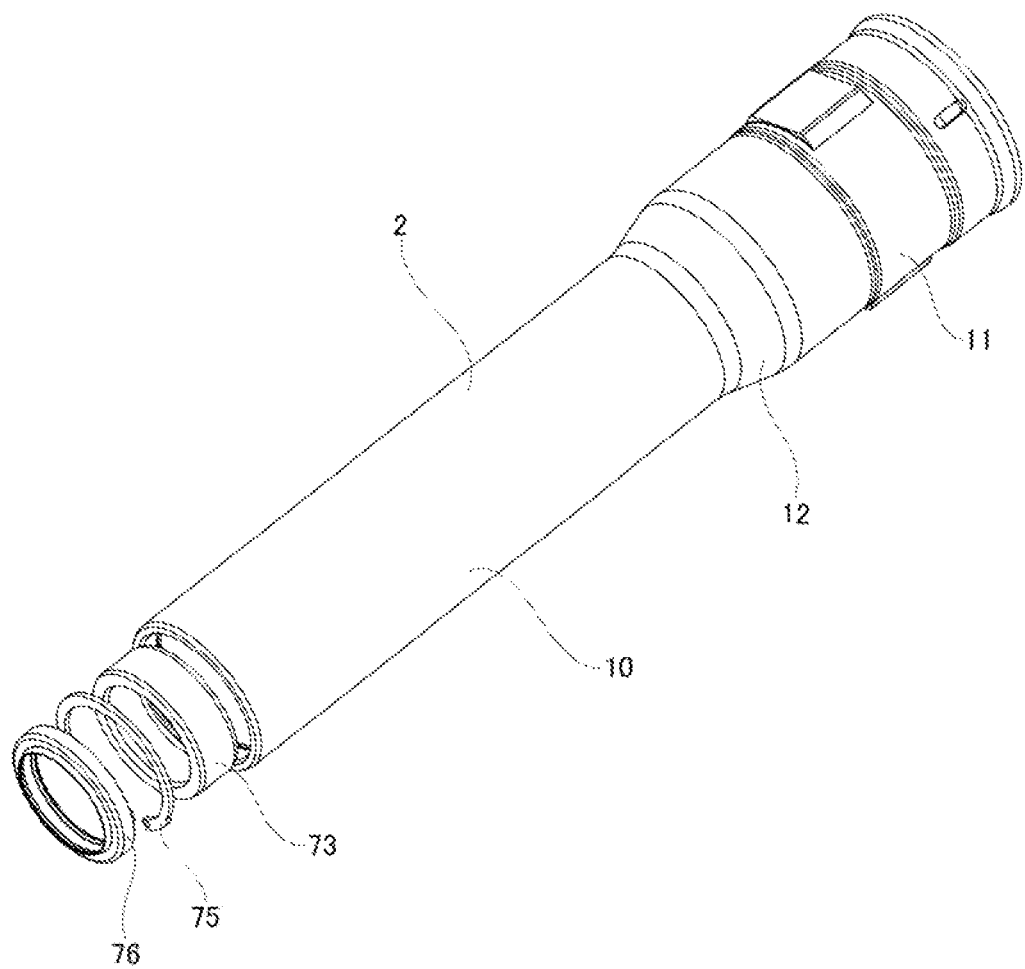
FIG. 5 is an exploded perspective view of an upper shell.

In addition, as illustrated in FIG. 5, the slide bearing 73 and the oil seal 76 are supported on the inner side of the small-diameter tubular section 10 of the upper shell 2.

Figure 6:
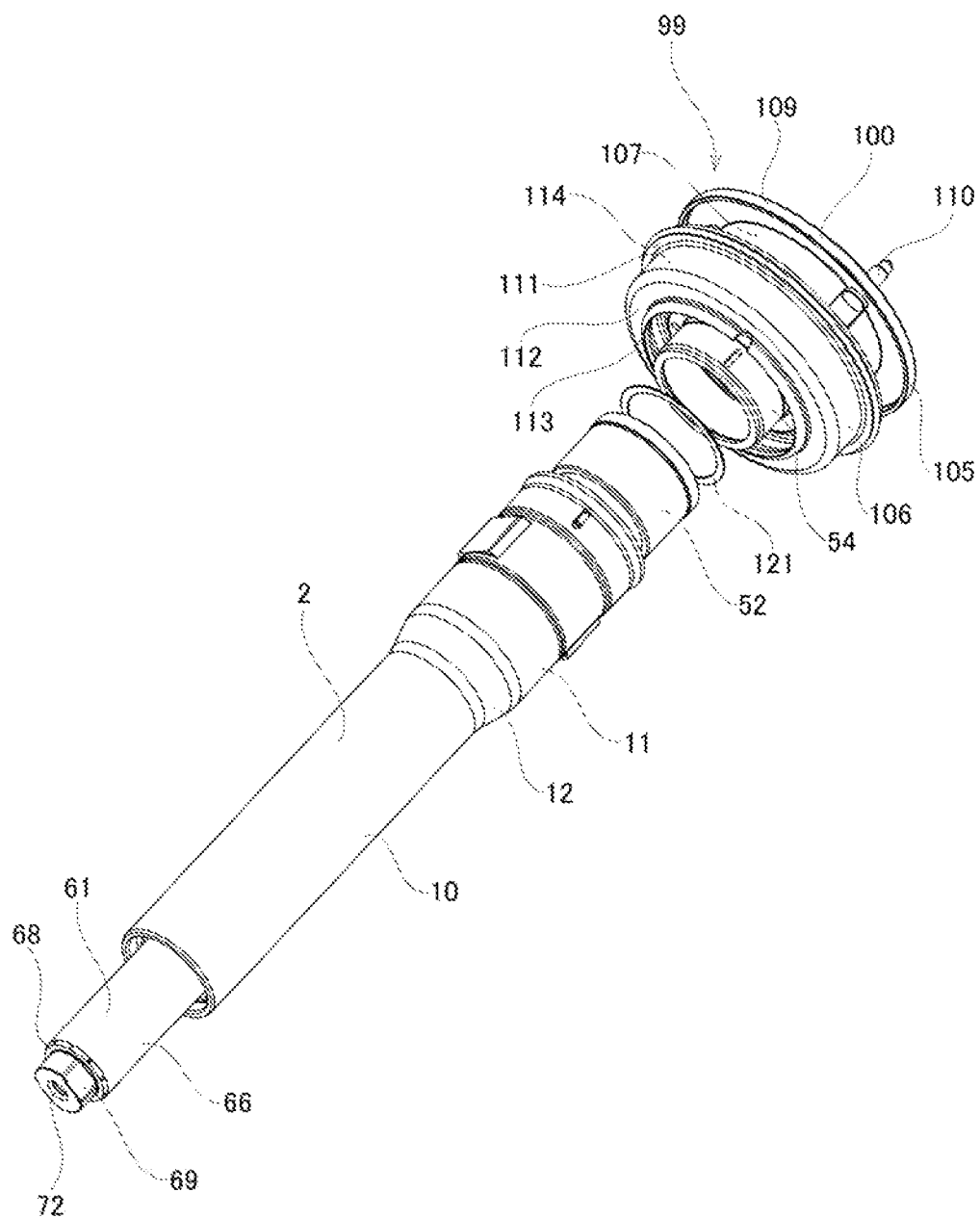
FIG. 6 is an exploded perspective view illustrating a state in which the intermediate assembly is supported on the inner side of the upper shell, and a mounting member is supported with respect to the upper shell.

Next, as illustrated in FIG. 6, the intermediate assembly 124 is supported on the inner side of the upper shell 2, and the mounting member 100 is supported by and fastened to the end section on the other side in the axial direction of the upper shell 2.

More specifically, the intermediate assembly 124 is inserted from the other side in the axial direction into the inner side of the upper shell 2. As a result, the ball nut 6 and the inner tube 61 are passed through the inner side in the radial direction of the stepped section 122 (flange section 9), the inner tube 61 is inserted into and internally fitted with the slide bearing 73 that is supported by the end section on the one side in the axial direction of the upper shell 2, and the ball nut 6 is moved to an intermediate section in the axial direction of the small-diameter tubular section 10. Next, the side surface on the one side in the axial direction of the pressing plate 35 of the bearing unit 5 is abutted against the side surface on the other side in the axial direction of the stepped section 122 (flange section 9) through the stopper holder 50, making it possible to position the bearing unit 5 in the axial direction with respect to the upper shell 2. Then, the sleeve 52 is internally fitted with the large-diameter tubular section 11 of the upper shell 2, and furthermore, the locking nut 54 of the mounting member 100 is screwed into the female screw section 53 provided around the inner circumferential surface of the end section on the other side in the axial direction of the large-diameter tubular section 11.

In the example in FIG. 6, a shim plate 121 is held between the end surface on the one side in the axial direction of the locking nut 54 and the end surface on the other side in the axial direction of the sleeve 52. However, the shim plate 121 may be omitted.

Figure 7:
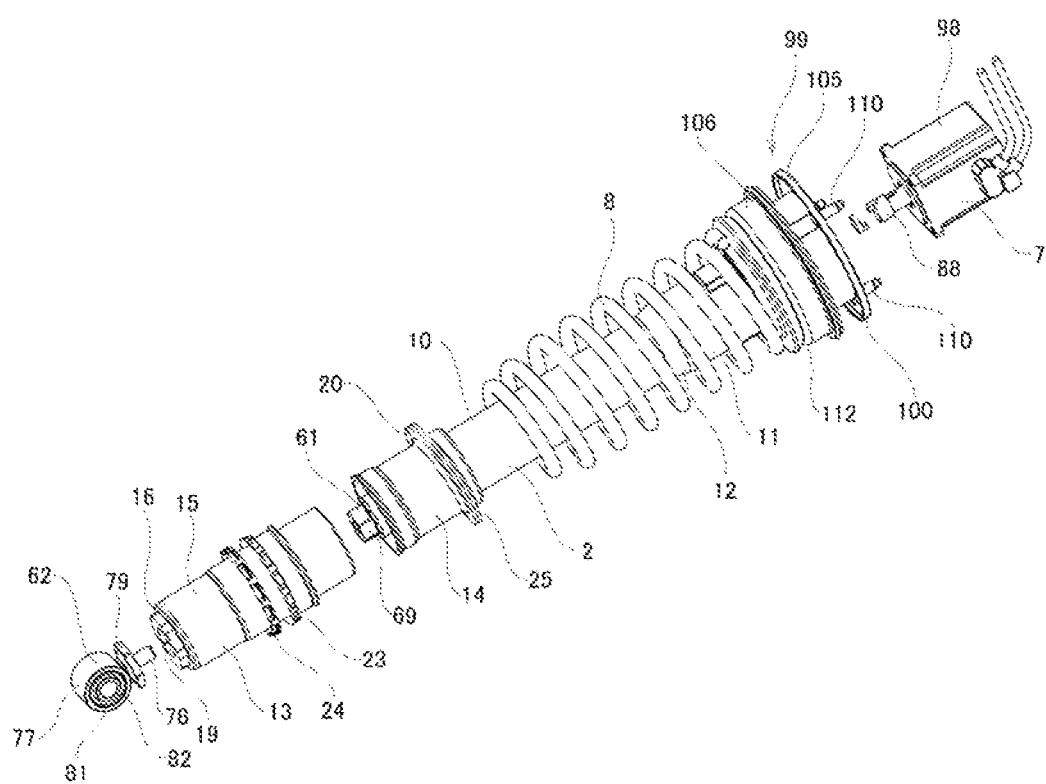
FIG. 7 is an exploded perspective view illustrating a state in which a coil spring is arranged around the upper shell, and together with the upper shell being combined with a lower shell, an output shaft of an electric motor is connected to a ball screw shaft.

Next, as illustrated in FIG. 7, the coil spring 8 is arranged around the upper shell 2, after which, together with supporting the lower shell 3 with respect to the inner tube 61 by the lower bushing 62, the output shaft 87 of the electric motor 7 is connected to the ball screw shaft 4, and the casing 98 is supported by and fastened to the mounting member 100.

In other words, the upper shell 2 is inserted from the one side in the axial direction into the coil spring 8, and the end section on the other side in the axial direction of the coil spring 8 is abutted against the end member 115. Next, the lower shell 3 is arranged around a part on the one side in the axial direction of the upper shell 2, and the engaging hole 19 of the lower shell 3 is fitted with the engaging shaft section 69 of the inner tube 61. Furthermore, the inner tube 61 and the lower shell 3 are joined together by screwing the male screw section 80 of the lower bushing 62 into the screw hole 72 of the inner tube 61.

Moreover, the end section on the one side in the axial direction of the output shaft 87 of the electric motor 7 is connected to the end section on the other side in the axial direction of the ball screw shaft 4 through the joint 88 so as to be able to transmit torque, and the casing 98 of the electric motor 7 is supported by and fastened to the mounting member 100 by screws or the like.

The steps for assembling the suspension device 1 described above include a step of supporting the intermediate assembly 124 on the inner side of the upper shell 2 after the intermediate assembly 124 has been assembled, however, this order may be reversed or performed simultaneously as long as there is no contradiction.

With the assembly method of the suspension device 1 of this example, the assembly work may be performed easily.

In the suspension device described in JP 2010-228579A, a ball screw mechanism and an inner tube are supported by and fastened to a casing of an electromagnetic motor, and the casing is joined and fastened to an upper support through a mounting section and anti-vibration rubber. In other words, the ball screw mechanism and the inner tube are positioned in the axial direction and supported by and fastened to the upper support through a heavy electromagnetic motor.

On the other hand, in the assembly method of the suspension device 1 of this example, an intermediate assembly 124 that includes the ball screw shaft 4, the bearing unit 5, the ball nut 6, the inner tube 61, and the bump stopper 118 is inserted from the other side in the axial direction into the upper shell 2. Then, the side surface on the one side in the axial direction of the bearing unit 5 is abutted against the side surface on the other side in the axial direction of the stepped section 122 (flange section 9) of the upper shell 2 through the stopper holder 50, whereby the ball screw shaft 4 is supported on the inner side of the upper shell 2 in a state in which the ball screw shaft 4 is positioned in the axial direction with respect to the upper shell 2. After that, the output shaft 87 of the electric motor 7 is connected to the end section on the other side in the axial direction of the ball screw shaft 4 by the joint 88 so as to be able to transmit torque, and the casing 98 of the electric motor 7 is supported by and fastened to the end section on the other side in the axial direction of the upper shell 2 by the mounting member 100.

In other words, before the heavy electric motor 7 is supported by and fastened to the upper shell 2, it is possible to support the ball screw shaft 4 on the inner side of the upper shell 2 in a state in which the ball screw shaft 4 is positioned in the axial direction with respect to the upper shell 2. Therefore, with the assembly method of the suspension device 1 of this example, the assembly work can be performed easily.

Furthermore, in this example, in a state in which the ball nut 6 and inner tube 61 are joined by bolts 85, the circumscribed circle diameter $D_n$ of the ball nut 6 and inner tube 61 (joined body of these) is less than the inner diameter dimension $d_f$ of the stepped section 122 (flange section 9) of the upper shell 2 ($D_n < d_f$), which makes it possible to pass the ball nut 6 and inner tube 61 through the inner side in the radial direction of the stepped section 122. Therefore, in a state in which the intermediate assembly 124 is formed by arranging the ball nut 6 together with the bearing unit 5 and bump stopper 118 around the ball screw shaft 4, it is possible to pass the ball nut 6 through the inner side of the flange section 9 of the upper shell 2 even in a case where the intermediate assembly 124 is inserted into the inner side of the upper shell 2 from an opening on the other side in the axial direction of the upper shell 2 starting with the end section on the one side in the axial direction of the intermediate assembly 124. In short, the ball screw shaft 4, the bearing unit 5, the ball nut 6, the inner tube 61, and the bump stopper 118 are combined and supported on the inner side of the upper shell 2, and as the intermediate assembly 124, can be handled as a single body. From this aspect as well, the assembly work of the suspension device 1 can be performed easily.

Moreover, in the suspension device 1 of this example, the lower shell 3 is externally fitted with the upper shell 2 so that relative displacement in the axial direction is possible, and the coil spring 8 is held between the end member 115 that is supported by and fastened to the end section on the other side in the axial direction of the upper shell 2 and the outward-facing flange section 20 of the lower shell 3. The coil spring 8 causes the suspension device 1 to contract over the entire length, or in other words, to elastically contract as the upper shell 2 and lower shell 3 relatively displace in directions toward each other. The suspension device 1 may also contract over the entire length up to where the side surface on the other side in the axial direction of the inward-facing flange section 74 of the upper shell 2 and the end surface on the one side in the axial direction of the ball nut 6 supported by the lower shell 3 collide through the rebound stopper 86. Therefore, with the suspension device 1 of this example, it is possible to more easily maintain the contractible amount of the coil spring 8 compared with the suspension device described in JP 2010-228579A.

REFERENCE SIGNS LIST

1 Suspension device
2 Upper shell
3 Lower shell
4 Ball screw shaft
5 Bearing unit
6 Ball nut
7 Electric motor
8 Coil spring
9 Flange section
10 Small-diameter tubular section
11 Large-diameter tubular section
12 Conical tubular section
13 Shell body
14 Lower retainer
15 Tubular section
16 Bottom section
17 Elongated hole
18 Male screw section
19 Engaging hole
20 Outward-facing flange section
21 Screw hole
22 Bolt
23 First locking nut
24 Second locking nut
25 Seat
26 Dust seal
27 Male ball screw groove
28 Supported section
29 Large-diameter section
30 Small-diameter section
31 Lower stepped section
32 Cylindrical-surface section
33 Male screw section
34 Bearing holder
35 Pressing plate
36a 36b Rolling bearing
37 Holder cylinder section
38 Outward-facing flange section
39 Inward-facing flange section
40 Screw hole
41 Annular section
42 Plate cylinder section
43 Through hole
44a, 44b Inner ring
45a, 45b Outer ring
46a, 46b Rolling body
47 Collar
48 Nut
49 Bolt 50 Stopper holder
51 O-ring
52 Sleeve
53 Female screw section
54 Locking nut
55a, 55b Oil seal
56 Bottomed hole
57 Ventilation hole in the radial direction
58 Ventilation hole in the axial direction
59 Ventilation path
60 Internal space
61 Inner tube
62 Lower bushing
63 Main body section
64 Nut flange section
65 Through hole
66 Cylindrical section
67 Tube flange section
68 Bottom section
69 Engaging shaft section
70 Screw hole
71 Ventilation hole
72 Screw hole
73 Slide bearing
74 Inward-facing flange section
75 Retaining ring
76 Oil seal
77 Annular section
78 Shaft section
79 Pressing flange section
80 Male screw section
81 Elastic member
82 Support ring section
83 Contact plate
84 Through hole
85 Bolt
86 Rebound stopper
87 Output shaft
88 Joint
89 Coupling
90a, 90b Dowel
91a, 91b Notch
92a, 92b Joining member
93 Lower collar
94 Upper collar
95 Notch
96 Upper stepped section
97 Notch
98 Casing
99 Bracket
100 Mounting member
101 Anti-vibration member
102 Male screw section
103 Tubular section
104 Annular section
105 Upper member
106 Lower member
107 Cylindrical section
108 Lower annular section
109 Upper annular section
110 Support bolt
111 Cylindrical section
112 Annular section
113 Bent section
114 Outward-facing flange section
115 End member
116 Elastic member
117 Support member
118 Bump stopper
119 Annular section
120 Cylindrical section
121 Shim plate
122 Stepped section
123 Ball
124 Intermediate assembly

The invention claimed is:

1. A suspension device comprising:
an upper shell having a tubular shape and having a stepped section around an inner circumferential surface of an intermediate section in an axial direction;
a lower shell arranged around a part on one side in the axial direction of the upper shell, and able to displace in the axial direction relative to the upper shell, but not able to rotate;
a ball screw shaft having a male ball screw groove around an outer circumferential surface of a part on the one side in the axial direction, and rotatably supported on an inner side of the upper shell;
a bearing unit arranged between a part on the other side in the axial direction of the ball screw shaft and the upper shell, and having an outer side part in a radial direction that is prevented from rotating with respect to the upper shell and that includes a side surface on the one side in the axial direction that comes in direct contact with or comes in contact through another member with a side surface on the other side in the axial direction of the stepped section, the bearing unit rotatably supporting the ball screw shaft with respect to the upper shell;
a ball nut having a female ball screw groove around an inner circumferential surface, the ball nut being screwed on the ball screw shaft;
a plurality of balls arranged between the male ball screw groove and the female ball screw groove so as to be able to freely roll;
an inner tube joined to the lower shell and the ball nut;
an electric motor having an output shaft that is connected to an end section on the other side in the axial direction of the ball screw shaft so as to be able to transmit torque, and supported by an end section on the other side in the axial direction of the upper shell; and
a coil spring held in an elastically compressed state in the axial direction between the upper shell and the lower shell;
wherein
the bearing unit includes a bearing holder, a pressing plate, and a rolling bearing,
the bearing holder includes a holder cylinder section, an outward-facing flange section that is bent toward an outer side in the radial direction from an outer circumferential surface of an end section on the one side in the axial direction of the holder cylinder section, the outward-facing flange section being fastened and internally fitted with the upper shell so as to prevent the bearing holder from rotating with respect to the upper shell, and an inward-facing flange section that is bent toward an inner side in the radial direction from an inner circumferential surface of an end section on the other side in the axial direction of the holder cylinder section,
the pressing plate includes an annular section having the side surface on the one side in the axial direction that comes in direct contact with or comes in contact through another member with the side surface on the other side in the axial direction of the stepped section, and a plate cylinder section that is bent toward the other side in the axial direction from an end section on the inner side in the radial direction of the annular section, the plate cylinder section being internally fitted with the end section on the one side in the axial direction of the holder cylinder section without looseness, the rolling bearing includes an inner ring that is externally fitted by press fitting with a part on the one side in the axial direction of the ball screw shaft, and an outer ring that is internally fitted with the holder cylinder section of the bearing holder and is held in the axial direction between a side surface on the one side in the axial direction of the inward-facing flange section and an end surface on the other side in the axial direction of the plate cylinder section, and a circumscribed circle diameter of the ball nut and the inner tube is less than an inner diameter dimension of the stepped section.

2. The suspension device according to claim 1, wherein the upper shell has a flange section that protrudes toward an inner side in the radial direction in the intermediate section in the axial direction, and the stepped section is configured by the flange section.

3. The suspension device according to claim 1, comprising a bump stopper having an outer diameter dimension that is equal to or less than the inner diameter dimension of the stepped section and is arranged around a part on the other side in the axial direction of the ball screw shaft, and having an outer circumferential surface that comes in contact with or closely faces an inner circumferential surface of the stepped section.

4. The suspension device according to claim 3, wherein a stopper holder that is internally fitted with a part on the other side in the axial direction of the bump stopper, and the stopper holder has an annular section that is held between the stepped section and the side surface on the one side in the axial direction of the bearing unit, and a cylindrical section that is bent toward the one side in the axial direction from an end section on the inner side in the radial direction of the annular section and is internally fitted with a part on the other side in the axial direction of the bump stopper.

5. An assembly method for the suspension device according to claim 1 comprising a process of positioning the ball screw shaft in the axial direction with respect to the upper shell by arranging the balls and the ball nut around a part on the one side in the axial direction of the ball screw shaft, and together with joining and fastening the inner tube to the ball nut, externally fitting and fastening the bearing unit around a part on the other side in the axial direction of the ball screw shaft to form an intermediate assembly, then inserting the intermediate assembly into the inner side of the upper shell from an opening on the other side in the axial direction of the upper shell starting with the end section on the one side in the axial direction of the intermediate assembly, passing the ball nut and the inner tube through the inner side in the radial direction of the stepped section, and bringing the side surface on the one side in the axial direction of the part on the outer side in the radial direction of the bearing unit that is externally fitted with and fastened to the ball screw shaft in direct contact with or in contact through another member with the side surface on the other side in the axial direction of the stepped section.

* * * * *